(12) United States Patent
Kikinis

(10) Patent No.: US 6,289,389 B1
(45) Date of Patent: *Sep. 11, 2001

(54) ENHANCED INTEGRATED DATA DELIVERY SYSTEM

(75) Inventor: Dan Kikinis, Saratoga, CA (US)

(73) Assignee: Lextron Systems, Inc., Saratoga, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,065

(22) Filed: Jun. 3, 1997

(51) Int. Cl.$^7$ .................................................. G06F 15/173
(52) U.S. Cl. ............................ 709/239; 709/238; 709/235
(58) Field of Search ..................................... 709/238, 239, 709/241, 240, 235, 244, 233; 714/2, 25; 370/400, 401; 455/427, 428

(56) References Cited

U.S. PATENT DOCUMENTS

| 5,381,527 | * | 1/1995 | Inniss et al. . |
| 5,392,450 | * | 2/1995 | Nossen ................................ 455/12.1 |
| 5,416,769 | * | 5/1995 | Karol ................................... 370/414 |

(List continued on next page.)

OTHER PUBLICATIONS

Tamir, Y. et al., "Design and Implementation of High–Speed Asynchronous Communication Ports for VLSI Multicomputer Nodes", IEEE SCAS'88, pp. 805–809, Jun. 1988.*

Kota, S.L. et al., "Media Access Protocols for High Speed Data Bus", IEEE MILCOM '92, ISBN: 0–7803–0585–X, pp. 1003–1010, Oct. 1992.*

Ward, C. et al., "A Data Link Control Protocol for LEO Satellite Networks Providing a Reliable Datagram Service", IEEE/ACM Trans. on Networking, ISSN: 1063–6692, pp. 91–103, Feb. 1995.*

Hain, T.F. et al. "Analysis of Least–Time and Minimum–Hop Routing for CLustered Temporal Networks", IEEE MILCOM '95, ISBN: 0–7803–2489–7, pp. 1144–1149, Nov. 1995.*

Salonidis et al., "Proximity Awareness and Fast Connection establishiment in Bluetooth", IEEE 0–7803–6534–8, pp. 141–142, 2000.*

Primary Examiner—Zarni Maung
Assistant Examiner—Jason D. Cardone
(74) Attorney, Agent, or Firm—Donald R Boys; Central Coast Patent Agency, Inc.

(57) ABSTRACT

A data delivery system comprises a server connected to data sources and adapted to transmit data to a user, a first link from the server adapted to transmit data to the user via a first delivery path, a second link from the server adapted to transmit data via a second delivery path to the user, the second delivery path having a broader bandwidth that the first delivery path; and transmission control routines. For each data entity to be transmitted to the user, the transmission control routines select either the first path or the second path for transmission, based on size of the data entity and preprogrammed criteria. The delivery system may have queues for satellite transmission, including a queue for such as data entities to provide a video stream, wherein entities must be sent at a minimum rate to avoid interruption of a video presentation. In one aspect, control routines of the invention divide non-video entities into portions small enough to avoid interruption of the video stream, and cause the divided portions to be sent interleaved with the video entities.

6 Claims, 3 Drawing Sheets

U.S. PATENT DOCUMENTS

| | | | |
|---|---|---|---|
| 5,487,167 | * | 1/1996 | Dinallo et al. . |
| 5,533,020 | * | 7/1996 | Byrn et al. .......... 370/395 |
| 5,550,836 | * | 8/1996 | Albrecht et al. .......... 370/85.2 |
| 5,557,320 | * | 9/1996 | Krebs .......... 348/12 |
| 5,572,517 | * | 11/1996 | Safadi .......... 370/431 |
| 5,771,234 | * | 6/1998 | Wu et al. .......... 370/396 |
| 5,793,957 | * | 8/1998 | Kikinis et al. .......... 709/211 |
| 5,812,930 | * | 9/1998 | Zavrel .......... 725/62 |
| 5,842,125 | * | 11/1998 | Modzelesky et al. .......... 455/426 |
| 5,844,890 | * | 12/1998 | Delp et al. .......... 370/230 |
| 5,850,517 | * | 12/1998 | Verkler et al. . |
| 5,852,721 | * | 12/1998 | Dillon et al. . |
| 5,870,563 | * | 2/1999 | Roper et al. . |
| 5,881,234 | * | 3/1999 | Schwob . |
| 5,881,315 | * | 3/1999 | Cohen . |
| 5,903,724 | * | 5/1999 | Takamoto et al. . |
| 5,903,735 | * | 5/1999 | Kidder et al. . |
| 5,907,621 | * | 5/1999 | Bachman et al. .......... 382/25 |
| 5,907,688 | * | 5/1999 | Hauck et al. .......... 710/107 |
| 5,923,756 | * | 7/1999 | Shambroom .......... 380/21 |
| 5,926,105 | * | 7/1999 | Wakamatsu .......... 340/825.31 |
| 5,931,901 | * | 8/1999 | Wolfe et al. .......... 709/206 |
| 5,933,090 | * | 8/1999 | Christenson .......... 340/825.69 |
| 5,933,500 | * | 8/1999 | Blatter et al. .......... 380/20 |
| 5,935,212 | * | 8/1999 | Kalajan et al. .......... 709/228 |
| 5,938,734 | * | 8/1999 | Yao et al. .......... 709/232 |
| 5,940,783 | * | 8/1999 | Kukutsu et al. .......... 702/120 |
| 5,944,783 | * | 8/1999 | Nieten .......... 709/202 |
| 5,950,124 | * | 9/1999 | Trompower et al. .......... 455/422 |
| 5,982,778 | * | 11/1999 | Mangin et al. .......... 370/445 |
| 6,005,561 | * | 12/1999 | Hawkins et al. .......... 725/38 |
| 6,088,734 | * | 7/2000 | Marin et al. .......... 709/232 |
| 6,097,736 | * | 8/2000 | Proctor et al. .......... 709/232 |
| 6,112,085 | * | 8/2000 | Garner et al. .......... 455/428 |
| 6,122,514 | * | 9/2000 | Spaur et al. .......... 455/448 |

* cited by examiner

ENHANCED INTEGRATED DATA DELIVERY SYSTEM

FIELD OF THE INVENTION

The present invention is in the field of Internet and Intranet network communication systems and has particular application to methods and apparatus including software used for the purpose of increasing speed and performance in transmitting data requested by a user from a data-gathering site to the user.

BACKGROUND OF THE INVENTION

Although the scope of the present invention is broader than a comparison between narrow-band land-based communication links and broadband broadcast transmission of data, that comparison is convenient for the purpose of illustrating embodiments of the invention, and is used extensively below.

The Internet is a global matrix of linked computers and file servers providing a virtually unlimited pool of knowledge to any user who has a connection for access. The state of the Internet is one that is constantly evolving and changing both in scope and technology. What has evolved from a type of military infrastructure, has become a largely civilian super-structure allowing exchange of information to take place rapidly from almost any location in the world.

At the time of the present patent application, Internet infrastructures are largely land-based, transmitting data over digital links and analog lines and the like. The typical user connections for the land-based infrastructure include a telephone line, a modem and an Internet Service Provider (ISP) through which the service is provided. Generally speaking, the connective elements described immediately above are all that is required for a user to receive the basic capability to access the Internet provided the user has a PC with at least minimum system requirements.

Given the ever-changing technological face of the Internet, it is not surprising that there have been many new developments in the methods of access and communication. For example, there are now satellite systems that allow a user access the Internet and receive information via broadcast into a satellite modem linked to the user's PC. One such satellite-based product is being introduced into new car models, giving the user the capability of accessing the Internet while mobile. As well, various other wireless systems are being developed and tested in the hopes of utilizing increased bandwidth capabilities and bypassing older, less reliable types of analog lines that are currently in place.

Digital information transferred over the Internet is transmitted in what are known in the art as data packets. These data packets vary in size and several packets may comprise one document in the form of a Web page to be viewed by the user, for example. If a particular file contains a large amount of graphics, larger individual data packets may be required creating a slower download time on the user's end before he or she can view the entire page on the receiving station. Similarly, video files and sound files comprise large packets of information, take up considerable memory contributing to long download times. A typical user having a PC that is rated as minimum in terms of system requirements for downloading such material, can find accessing the Internet and downloading material to be frustrating. In many cases, PC systems can lock-up on the user's end requiring a re-boot to re-connect. Accessing some files can take several minutes or more and may cause the user to abort the download for lack of patience.

While technological improvements have been made to alleviate congestion and bottlenecks that may occur due to increased network traffic, such as replacing older lines and connections with those capable of transmission at a higher bandwidth, these types of improvements are not generally found over an entire infrastructure. Modems that can download material at higher speeds are now available as well, however, many existing lines cannot carry the information at the modem's highest speed. For example, if a user installs a 56 kilobytes per second (Kbps) modem, he may still, depending on the quality of line and the speed at which the data was sent, only realize a slight increase in the time it takes to download the particular files. Compression of files is sometimes used as a technique to enable faster download times, but this expedient requires the user to have the appropriate software to decompress that particular file type. Often different software applications must be purchased by the user in order to decompress differing file types and so on. Many of these improvements cost the user in terms of the money and time spent to install and operate them.

There are, as described above, various satellite systems that have been developed and tested for Internet communication that can significantly increase the capacity of distributing large packets of information by virtue of a significantly higher bandwidth capability when compared to land-based systems. The information can be received by a user connected to a special satellite modem and receiver dish that captures transmitted information that is broadcast on a specific channel to which the user's modem is tuned. One problem with this method is that anyone with a suitable receiver can intercept transmissions, which makes privacy an issue. Also, broadcast interference caused by another broadcasting source is always possible. A further problem is that in the case of a large number of subscribers to such a system, available bandwidth can be reduced by a large number of users sharing the broadcast system.

What is clearly needed is a method and apparatus including software wherein a user can be connected both to a low-bandwidth system, such as a typical land-based modem connection through the public switched telephone network, and to a high-bandwidth delivery system, such a cable TV or a satellite system simultaneously so as to be able to receive information at a high rate without losing any security features inherent to the land-based system, and to enable a situation where information to be transmitted could be sent in the most efficient manner. Such a system would be enhanced with a software designed to detect and utilize the fastest route back to the user based on real-time analysis at the point of transmission of the fastest route for each packet sent.

SUMMARY OF THE INVENTION

In a preferred embodiment of the present invention data delivery system is provided, comprising a server connected to data sources and adapted to transmit data to a user; a first link from the server adapted to transmit data to the user via a first delivery path; a second link from the server adapted to transmit data via a second delivery path to the user, the second delivery path having a broader bandwidth that the first delivery path; and transmission control routines. For each data entity to be transmitted to the user, the transmission control routines select either the first path or the second path for transmission, based on size of the data entity and preprogrammed criteria.

In a preferred embodiment the first path is a land-based path, and the second path is a satellite transmission path. In other embodiments there may be paths of other sorts between which the control routines may select for delivery. In some of the transmission, queues are maintained for data entities to be sent by the more broadband path, and the transmission control routines negotiate with queue control routines regarding queue capacity and queue use level as a part of the transmission path selection. Encryption may also be done, and an encryption key sent to a user by a separate path than the encrypted data is sent.

In some embodiments fail-safe operation is accomplished, wherein, upon failure of one of the delivery paths, all data entities are routed by the remaining path. Also in some embodiments the transmission control routines are adapted to divide a data entity selected for broadband transmission into multiple smaller data entities before transmission. In this case a division key is typically sent to the user.

The selective transmission system provided and taught herein provides for the first time a method for utilizing the best features of both a broadband and a narrower band transmission system in delivering data, while also providing fail-safe operation, encryption for security, and other salient features.

BRIEF DESCRIPTION OF THE DRAWING FIGURES

DESCRIPTION OF THE PREFERRED EMBODIMENTS

Figure 1:
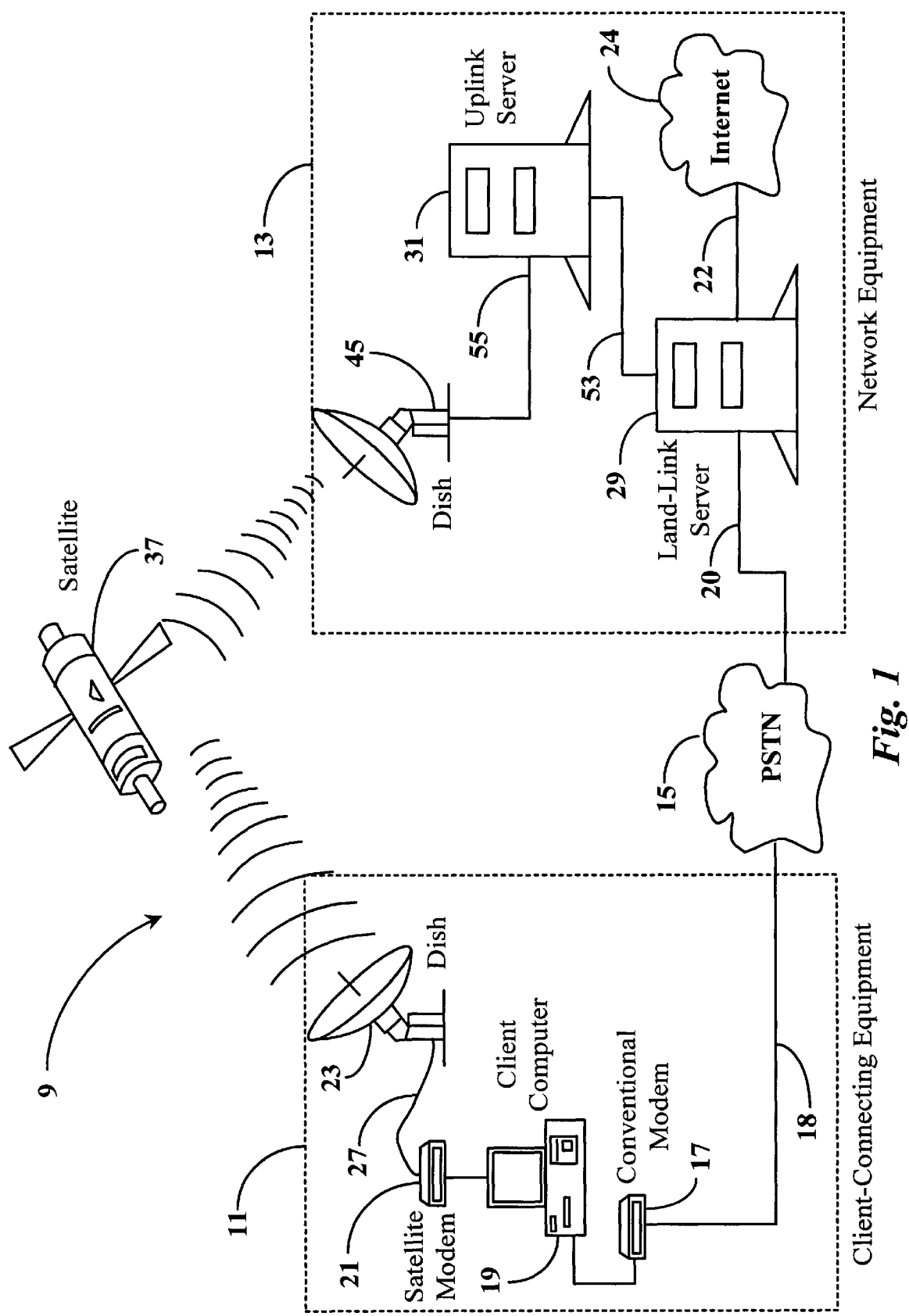
FIG. 1 is an illustration of an enhanced Internet delivery system according to an embodiment of the present invention.

FIG. 1 is an illustration of an enhanced Internet delivery system according to an embodiment of the present invention, wherein land-based delivery technology is integrated with satellite delivery technology to create an Internet delivery system 9 taking advantage of the best features of both. Internet delivery system 9 comprises two distinct sets of equipment illustrated and enclosed within dotted rectangles. Illustrated in FIG. 1 are client connecting equipment 11, and network equipment 13.

As stated once above, it is repeated here that the example provided, illustrating a modem-connected land based Internet connection through a public-switched telephone network, and a satellite transmission system, is a limited example of the invention. The invention extends in scope to any situation where a data source is connected by two paths to a data destination, wherein one of the paths has a significantly higher bandwidth than the other path and is typically of broadcast type, and wherein the data source is adapted to select between the paths for transmitting the data or portions of the data.

In the example of FIG. 1, client connecting equipment 11 comprises in this embodiment a PC 19, a conventional modem 17, a satellite modem 21, and a home receiver dish 23. Conventional modem 17 is connected to a Telephone Network 15 (e.g. PSTN) via a telephone line 18. Link 18 may in other embodiments be any sort of relatively low-bandwidth link, such as ISDN or fiber optic, cellular phones or PCS (personal communication services) phones.

In a preferred embodiment a user will initiate an Internet session via analog modem 17 over analog link 18 through PSTN 15. Satellite modem 21 and home receiver dish 23 are utilized for the purpose of receiving satellite signals and will be described in more detail below.

On the network delivery side, network equipment 13 comprises a Proxy-Server 29, which is a special subscriber-only server executing unique control generic to embodiments of the present invention. When a user initiates an Internet session, he or she connects through proxy server 29.

It will be apparent to one with skill in the art that there may be more than one server such as proxy-server 29 on the network, however, in this instant embodiment only one is shown and deemed sufficient by the inventor for the purpose of adequately illustrating embodiments of the present invention. Also, other functions may coexist on proxy-server 29. The unique functions of proxy-server 29 as they applies to the present invention are described in further detail below.

Proxy-server 29 is connected by a digital link 22 to the Internet represented by Internet cloud 24. It will be apparent to one with skill in the art that proxy-server 29 is part of the WWW network and that connection thereto may take place at any point in-between proxy-server 29 and analog link 18 such as in the case of an Internet Service Provider (ISP) in PSTN cloud 15. Connection to proxy server 29 may be made in some embodiments through an Internet Service Provider (ISP), or proxy server 29 may be provided by an ISP.

An up-link satellite server 31 in this embodiment is connected via a digital link 53 to proxy-server 29 and also to a satellite sending dish 45 by digital link 55 that is capable of converting and broadcasting digital information over specific channels to be received and relayed by a satellite 37. It will be apparent to one with skill in the art that there may be more than one up-link server 31 as well as more than one satellite sending dish 45 on any given network. The number of servers and sending dishes is only limited by the size of the network. For example, a very large global system having a large number of world-wide subscribers may duplicate the aforementioned equipment in various strategic locations around the world so as to be able to access a number of strategically-placed satellites. Similarly, if the network is very small, such as a regional corporate network, a lesser number of servers and the like would be sufficient.

In other embodiments of the present invention there need not be an uplink server. The functions of the uplink server could be performed by control routines at the proxy server, and only the one server is required. This is true also in embodiments of the invention wherein other broadband transmission methods may be used in lieu of satellite systems.

In accordance with a preferred embodiment of the present invention, satellite 37 rebroadcasts digital information which may be received by any receiving dish in line-of-sight, such as home receiving dish 23 at the user's end. Digital information destined for a particular user can then be sorted by the satellite modem using an identification system and transmitted into the User's PC via a cable link 27. Also, the data is preferably packed into a complete digital transport stream, as used on digital broadcast satellites and digital CTV systems, such that no transport stream demultiplexion is required.

Internet delivery system 9 is an information loop whereby information requested via land-based connection can be sent back to the user over either a satellite connection or back over the land connection. This is made possible by virtue of unique control routines termed by the inventor Asymmetric Point to Point Protocol (APPP). Matching instances of APPP drivers are installed on PC 19 and on proxy server 29, and these drivers act to control modems at both locations. It will be apparent to one with skill in the art that there may be as many modems connected to proxy-server 29 as deemed necessary to handle the amount of network traffic that will be processed. It will also be apparent to those with skill in the art that there is considerable leeway in where the drivers may be resident and executed. In many situations, for example, servers have satellite processors running control routines for serving communication needs of the server, called in some circles Port Masters™. In other instances a main CPU in the server may execute the communication control routines.

In a preferred embodiment of the present invention, APPP is layered to existing instances of Transfer Control Program/Internet Protocol (TCP/IP) sometimes referred to by those skilled in the art as a TCP/IP stack. While TCP/IP and PPP are both well known Internet standards, PPP as is used in accordance with the present invention with a selective multi-link capability installed in proxy-server 29 is asymmetric rather than symmetric, thereby giving it an ability to select from alternative routes back to the user, based on available information at the time the decision is made.

The choice of route in sending information to a user in embodiments of the invention is determined by such factors as packet size of digital information, latency characteristics of the satellite path compared to those of the land-based path, and the amount of waiting time in the sever queues associated with up-link server 31. The function of APPP routines in preferred embodiments of the present invention are further detailed below.

Figure 2:
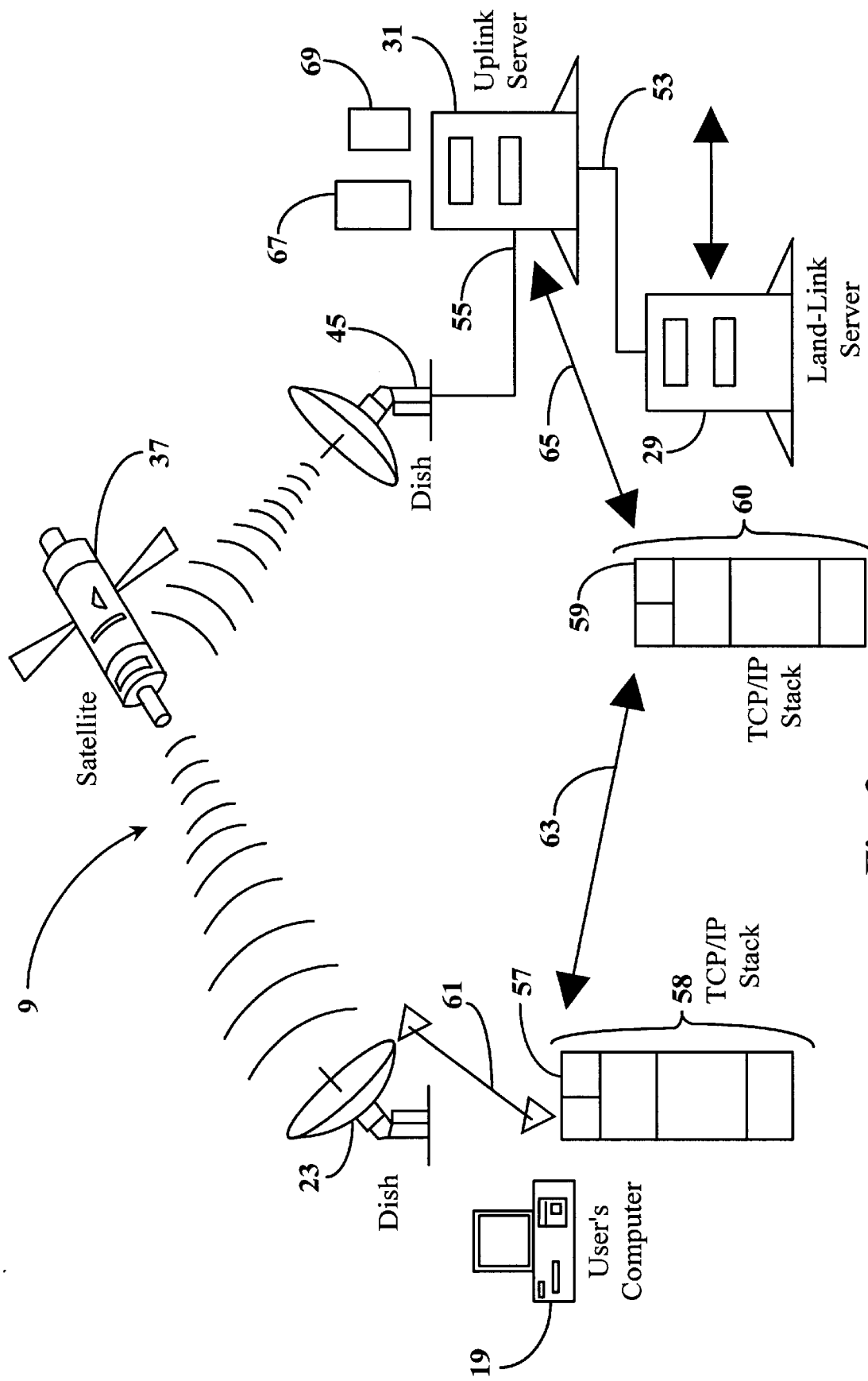
FIG. 2 is an illustration of the Internet delivery system of FIG. 1 showing additional elements.

FIG. 2 is an illustration of Internet delivery system 9 showing additional detail of the organization and the function of control routines in a preferred embodiment of the present invention, and connectivity to other instances of control routines.

An APPP driver 57 is layered to TCP/IP stack 58 installed on PC 19 of the user. When the user is on-line and engaged in an active session with proxy-server 29 in the network, an active connection 63 is made to a matching instance of APPP driver 59 layered to TCP/IP stack 60 installed in proxy-server 29. Similarly, the muti-link enhancement to the matching instance of APPP driver on proxy-server 29 allows it to communicate via active connection 65 with software that controls waiting queues 67 and 69.

Waiting queues 67 and 69 are for the purpose of queuing data packets in order of priority that will be sent via satellite to various users that subscribe to the service. For example, queue 67 may be a higher priority video conference queue whereas queue 69 may be a Web page queue and so on. It will be apparent to one with skill in the art that there may be many such queues associated with up-link server 31 as may be needed for different types and priorities of communication. Active connections 63 and 65 are two-way communication links wherein data can be processed in both directions. In this instant embodiment we are only concerned with downloading information from the Internet. In the case of satellite transmission to the user, active connection 61 in this example represents a one way communication from home receiving dish 23 and APPP 57 installed at PC 19.

It will be apparent to one with skill in the art that active connections shown in this instant embodiment take place over the existing links shown in the embodiment of FIG. 1. For example, active connection 63 is through links 18, 20 and PSTN cloud 15 of FIG. 1 whereas active connection 65 is through link 53 of FIG. 1 and so on. It will also be apparent to one with skill in the art that any variety and number of links may be used and present in any given network provided they are open when the user is engaged in an active session. Further, the term link, as is used in the text of this application, is generic in the sense that it may include modems, switches, routers, personal computers, servers or any other hardware that serves to complete an Internet connection with the only requirement for definition of the term being that all connections present are open and communication is active.

Referring again to FIG. 2, while data packets are arriving at proxy-server 29, they are analyzed for size by APPP driver 59. Active connection 65 is then opened almost simultaneously to up-link server 31. The current latency period for each travel path is calculated along with the waiting period associated with the particular queue that the data packet would be sent to such as queue 67. Latency periods (the time it takes for a data packet to reach a user over a particular route) may vary widely and are affected by such factors as time of day, recently installed up-grades to infrastructure, current network traffic, and so on. A decision is then made as to whether, in this particular embodiment, the land-based path or the satellite path will be faster for that size of packet at that particular time. If it is determined that the land-based path is faster, then the data packet is sent to the user via digital link 20, PSTN cloud 15 and link 18 through analog modem 17 and into PC 19 of FIG. 1. If, however, it is determined that the satellite path would be faster, then the data packet is sent to up-link server 31 via link 53 of FIG. 1. Once the data packet is appropriately queued in up-link server 31 the data packet is tagged with the appropriate IP address for identification by control software running in PC 19, which may have a resident filter in satellite modem 21 of FIG. 1.

At this time the information may also be encrypted for security and a decryption key may be sent back to the user via digital link 53 of FIG. 1 to proxy-server 29 and back through digital link 20, PSTN cloud 15, analog link 18 through analog modem 17 and into the users PC. Once the encryption process has taken place and the key has been sent via land, the data packet proceeds through digital link 55 to satellite sending dish 45 where it is broadcast to home receiving dish 23, where it is picked up by satellite modem 21 through cable 27 and downloaded into PC 19. It will be apparent to one with skill in the art that there are other ways to tag data packets than by using an IP address, such as supplying a password generic to a subscriber and so on. These tagging methods are well known in the art and are in use in other types of systems.

As data packets are handled individually, it will be apparent to one with skill in the art that in a system of the invention whereby the user is connected to both a land route and a satellite route as described above, information from the same source can be sent by land and satellite at the same time. For example, a graphic-intensive Web page containing animation as well as sound and text may be sent in several data packets with the smaller packets arriving via land, and the larger ones via satellite. This unique feature allows for faster transmission of the entire Web page to the user's browser, which can then sort the information and display the page in normal fashion.

In another embodiment of the invention, special packets may be marked for broadcast to a group or to all users. That would allow virtual Internets running on top of this architecture to address all their sites at the same time, e.g. to update a price list to all supermarket of a chain, for example, in a short time.

In another embodiment of the present invention, a failsafe feature is incorporated into the software of the present invention whereby the data packets are automatically sent to the user via the remaining alternate path if, for instance, an interruption in service were to occur temporarily disabling one path. For example, if the user has data packets in queue in up-link server 31, and his home receiving unit failed, then those data packets would be returned to proxy-server 29 and routed back along the land-based path. Similarly, if for some reason his data packets are queued in proxy-server 29 for normal transmission via the land-based path and a sudden disruption of service occurs along that route the data packets would be sent to up-link server 31 and queued to arrive via satellite. It will be apparent to one with skill in the art that re-routing in such instances could also be done on the existing paths as well, such as in a case where a server has failed along a land link and another server in a cluster is brought into play as a back-up and so forth. Or perhaps, in a case where a broadcasting satellite is too far away for the home receiving dish to pick up a direct signal, a subsequent tower with a receiving and sending capability could mirror the broadcast to a location close enough to the user to receive it and so on.

In another embodiment of the present invention, the satellite system is equipped with multiple channels for broadcasting data and could send an indicator to the user via land as to which channel to tune the satellite modem to for picking up the signal. This embodiment would have a greater control over network traffic via channeling a certain number of subscribers through specific channels thus enabling the regulation of network traffic.

In yet another embodiment of the present invention, APPP driver 59 performs an additional function of slicing large data packets and sending reduced-sized packets via the satellite path. This added capability is to prevent a particular problem in transmission that can be caused by very large files. Assume, for example, that the satellite link is capable of sending data at 20 Mbps. A file of 80 Mb arrives at server 29, and the APPP driver determines the best route is the satellite path. Now assume that queue 67 is reserved for video, and to provide uninterrupted video at the user's PC, a packet must be sent every fraction of a second. If the 80 Mb file is queued in queue 69, when it is sent, it will tie up the satellite transmission for about four seconds. Assuming packets need to be sent during this interim from queue 67 for video (or any other type of real-time data stream), the four second transmission of a single packet will cause an interruption in the video stream at the user's end.

In an embodiment of the invention, packets of a size large enough to cause such an interruption as that described above are divided into packets small enough to be sent in between bursts from queue 67, so the larger file may be transmitted without disrupting the video stream. The size to cause such a division, and the dividing factor will be determined by such factors as the capacity of the satellite link, and the time that may be available for transmission between video packet transmission.

When the dividing ability is invoked, it is necessary to announce the division to the user's station, so the divided packets may again be assembled into the original much larger file. A security key ability was described above wherein an encryption key is sent via land connection to decrypt files sent by satellite link. A similar method is used for the file dividing characteristic. A division key is sent by land connection informing the user that a large file is coming comprising X associated smaller packets. The smaller packets may then be identified and reassembled at the user's end.

In an alternative embodiment the division key is sent as a part of a header associated with the first divided file sent as a part of a larger file. In this alternative, when a first smaller file arrives, the user's system is informed that the next "y" identified files are to be reassembled into a larger file. In this manner, disruption of services requiring periodic transmission may be avoided.

Figure 3:
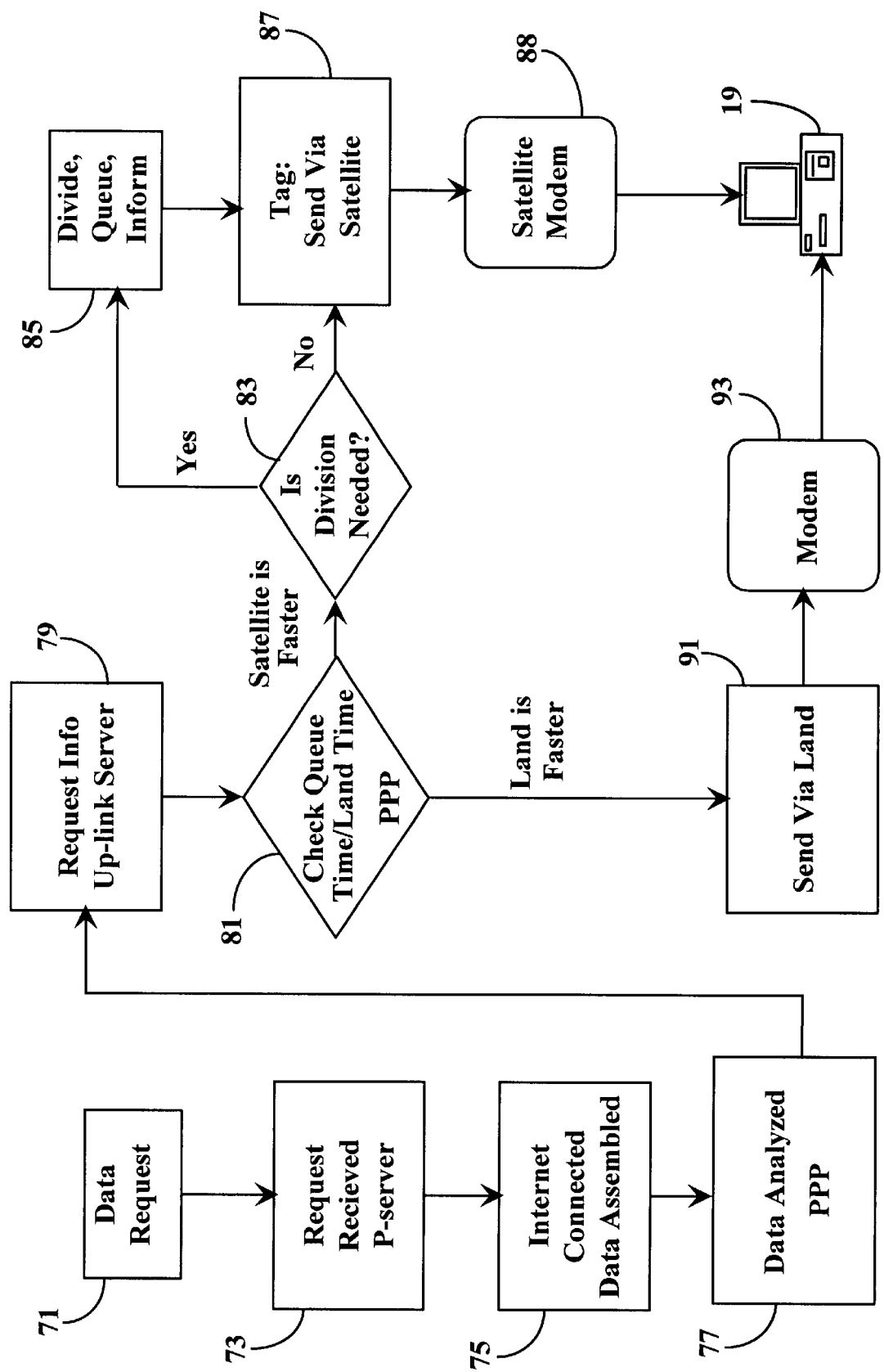
FIG. 3 is a flow diagram illustrating steps in practicing the invention in a preferred embodiment.

FIG. 3 is a process flow diagram illustrating a simplified function of the APPP software as is used in an embodiment of the present invention wherein a user that is logged onto the Internet sends a data request in step 71. In step 73 the request is received by proxy-server 29 of FIG. 2. The source of requested information such as a server in Internet cloud 24 of FIG. 1 is contacted and the data packets are sent to proxy-server 29 in step 75. At steps 77 and 79, APPP software applications analyze the data packets in accordance with an embodiment of the present invention, as described above with reference to FIG. 2, while at the same time requesting and receiving information from up-link server 31 regarding latency, queue waiting periods, etc. At step 81 the information received in step 79 is analyzed and associated with the information regarding the size of the data packet, and calculations are made to determine which path might be appropriate for that particular data packet at that particular time.

In an alternate embodiment, periodic system analysis checks can be performed whereby arbitrary data packets can be sent along various routes by up-link server 31 and timed for return. This information could be stored in a stat-server as described above and accessed in step 79. Statistical information of this sort may be accessed and used as well in the decision process.

As described above with reference to FIG. 2, if calculations indicate that the satellite route is faster, then the satellite path is chosen. If it is determined that the satellite path is faster, control goes to step 83, and a decision is made as to whether division is needed. If yes, control goes to step 85, division is accomplished, the smaller files are queued, and a division key is either prepared and sent to the user via land route or in a satellite packet header. The data packet or packets are then sent to up-link server 31 of FIG. 2 in step 87 where the data packet is tagged and possibly encrypted for security, and queued in the appropriate queue such as queue 67 of FIG. 2. At step 88 the data packets sent by satellite are received by satellite modem 21 of FIG. 1 and downloaded into PC 19.

If the calculations performed at step 81 indicate that the land route would be faster at that particular time, then the land route is chosen and the data packet is sent directly to the user via the land route in step 91. In step 93, modem 17 of FIG. 1 receives the data packet for download into PC 19.

It will be apparent to one with skill in the art that the software of the invention could be configured many different ways without departing from the spirit and scope of the present invention, such as by having multi-links to different servers where additional information can be accessed for help in the determination and calculation regarding latency queues and so on. In one embodiment the software could notify a user via pop-up window on his PC and inform him of status of information queued for satellite such as approximately when the information will arrive and the like. It will also be apparent to one with skill in the art that a subscriber to Internet delivery system 9 could achieve two-way satellite communication without departing from the spirit and scope of the present invention with the addition of a sending unit in home receiver dish 21. Many other variations of configuration are possible such as those embodiments already described above.

It will be apparent as well to those with skill in the art that there are many alternatives to the embodiments described that might be practiced without departing from the spirit and scope of the invention. Many such alternatives have already been described above. A very important one is that the land-based route shown with a satellite-route alternative is only exemplary, and the decision-making functions and alternative routing described may be practiced in ant data delivery system wherein alternative routes of different bandwidths are available. In some systems as well, as described briefly above, it is not required to have a separate server for uplink, queueing and the like, and al such functions could be performed on a single server. The spirit and scope of the present invention are limited only by the claims that follow.

What is claimed is:

1. A data delivery system, comprising:

a server connected to data sources for transmitting data to a user;

a first link from the server for transmitting data to the user via a land-based delivery path;

a second link from the server for transmitting data via a satellite transmission delivery path to the user;

a plurality of prioritized queues dedicated to different types of data for transmission; and transmission control routines;

wherein, for each data entity to be transmitted to the user, the transmission control routines select either the first path or the second path for transmission, based on size of the data entity, preprogrammed criteria regarding expected latency, and at least in part upon the state of the queues and their priority.

2. The data delivery system of claim 1 wherein the first path is a land-based path, and the second path is a satellite transmission path.

3. The data delivery system of claim 2 wherein the transmission control routines divide a data entity selected for satellite transmission into multiple smaller data entities before transmission.

4. The data delivery system of claim 3 wherein the transmission control routines, upon dividing a larger data entity into smaller data entities, prepares and transmits a division key to the user, the division key for re-assembling the multiple entities back into the larger entity.

5. The data delivery system of claim 2 wherein the transmission control routines, upon failure of one of the land-based and satellite delivery paths, route all data entities by the remaining path.

6. The data delivery system of claim 2 wherein the transmission control routines encrypt data entities before transmission on the second path, and provides an encryption key for transmission to the user, wherein the encryption key is transmitted on the first path.

* * * * *